United States Patent
Nicholson et al.

(10) Patent No.: US 9,019,218 B2
(45) Date of Patent: Apr. 28, 2015

(54) ESTABLISHING AN INPUT REGION FOR SENSOR INPUT

(75) Inventors: John Weldon Nicholson, Cary, NC (US); John Miles Hunt, Raleigh, NC (US); Hiroshi Ito, Sagamihara (JP); Elif Karakaya, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 13 days.

(21) Appl. No.: 13/437,610

(22) Filed: Apr. 2, 2012

(65) Prior Publication Data

US 2013/0257750 A1 Oct. 3, 2013

(51) Int. Cl.
*G06F 3/041* (2006.01)
*G06F 3/0488* (2013.01)

(52) U.S. Cl.
CPC .................................. *G06F 3/04886* (2013.01)

(58) Field of Classification Search
CPC ............. G06F 3/0488; G06F 3/04883; G06F 3/04886; G06F 2203/04803
USPC ................................... 345/156–184; 715/863
See application file for complete search history.

(56) References Cited

U.S. PATENT DOCUMENTS

| | | | |
|---|---|---|---|
| 5,982,302 A * | 11/1999 | Ure .................................. | 341/22 |
| 8,325,150 B1 * | 12/2012 | Reeves et al. .................. | 345/173 |
| 2004/0217944 A1 * | 11/2004 | Kong ............................. | 345/173 |
| 2008/0040692 A1 * | 2/2008 | Sunday et al. ................ | 715/863 |
| 2009/0128516 A1 * | 5/2009 | Rimon et al. .................. | 345/174 |
| 2009/0213085 A1 * | 8/2009 | Zhen et al. ..................... | 345/173 |
| 2010/0095206 A1 * | 4/2010 | Kim .............................. | 715/702 |
| 2010/0141590 A1 * | 6/2010 | Markiewicz et al. ......... | 345/173 |
| 2011/0099476 A1 * | 4/2011 | Snook et al. ................... | 715/728 |
| 2011/0273388 A1 * | 11/2011 | Joo et al. ....................... | 345/173 |
| 2012/0084681 A1 * | 4/2012 | Cassar .......................... | 715/761 |
| 2012/0216113 A1 * | 8/2012 | Li ................................. | 715/702 |
| 2013/0120434 A1 * | 5/2013 | Kim .............................. | 345/594 |

* cited by examiner

*Primary Examiner* — Gene W Lee
(74) *Attorney, Agent, or Firm* — Kunzler Law Group

(57) ABSTRACT

An apparatus for establishing an input region for sensor input includes a storage device storing machine-readable code and a processor executing the machine-readable code. The machine-readable code includes a recognizing module recognizes a control gesture sensed by a sensor. The machine-readable code includes an establishing module establishes an input region for sensor input in response to the recognition module recognizing the control gesture. The input region includes a confined region of a total sensing area sensed by the sensor.

20 Claims, 7 Drawing Sheets

ESTABLISHING AN INPUT REGION FOR SENSOR INPUT

BACKGROUND

1. Field

The subject matter disclosed herein relates to sensor input and more particularly relates to establishing an input region for sensor input.

2. Description of the Related Art

Information processing systems may have various methods and devices for receiving input from user. The mouse and the keyboard have been joined by touchpads, touchscreens, and even motion sensors, as potential input devices. Touchscreens typically accept user input, such as user contact and/or motion, on the surface of the touchscreen. Similarly, motion sensors typically are enabled to sense motion in different locations of a sensing area.

However, at times, input in certain locations of a sensing area of a touchscreen or motion sensor may be undesirable. For example, a user may be playing a video game in front of a motion sensor and another person may walk by within the sensing area, causing unwanted user input.

BRIEF SUMMARY

Based on the foregoing discussion, the inventors have recognized a need for an apparatus, system, and method for establishing an input region for sensor input. Beneficially, such an apparatus, system, and method would establish an input region based on recognized control gestures.

The embodiments of the present subject matter have been developed in response to the present state of the art, and in particular, in response to the problems and needs in the art that have not yet been fully solved by currently available sensors. Accordingly, the embodiments have been developed to provide a method, apparatus, and system for establishing an input region for sensor input.

An apparatus is provided with a storage device storing machine-readable code, a processor executing the machine-readable code, and a plurality of modules configured to functionally execute the steps for establishing an input region for sensor input. These modules in at least a portion of the described embodiments include a recognizing module and an establishing module.

In one embodiment, the recognizing module recognizes a control gesture sensed by a sensor. In one embodiment, the establishing module establishes an input region for sensor input in response to the recognition module recognizing the control gesture. In a further embodiment, the input region includes a confined region of a total sensing area sensed by the sensor.

In one embodiment, the confined region is a sub-region of the total sensing area sensed by the sensor. In one embodiment, the apparatus includes an enforcing module translating gestures sensed within the input region into input events and ignoring gestures sensed outside the input region.

A method is also presented; in the disclosed embodiments, the method substantially includes the steps to carry out the functions presented above with respect to the operation of the described apparatus. In one embodiment, the method includes recognizing a control gesture sensed by a sensor. In one embodiment, the method includes establishing an input region for sensor input in response to recognizing the control gesture. In a further embodiment, the input region includes a confined region of a total sensing area sensed by the sensor.

In one embodiment, the confined region is a sub-region of the total sensing area sensed by the sensor. In one embodiment, the method includes translating gestures sensed within the input region into input events and ignoring gestures sensed outside the input region.

A computer program product including a storage device storing machine readable code executed by a processor to perform operations is also presented. In one embodiment, operations include recognizing a control gesture sensed by a sensor. In one embodiment, the operations include establishing an input region for sensor input in response to recognizing the control gesture. In a further embodiment, the input region includes a confined region of a total sensing area sensed by the sensor.

In one embodiment, the confined region is a sub-region of the total sensing area sensed by the sensor. In one embodiment, the operations include translating gestures sensed within the input region into input events and ignoring gestures sensed outside the input region.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
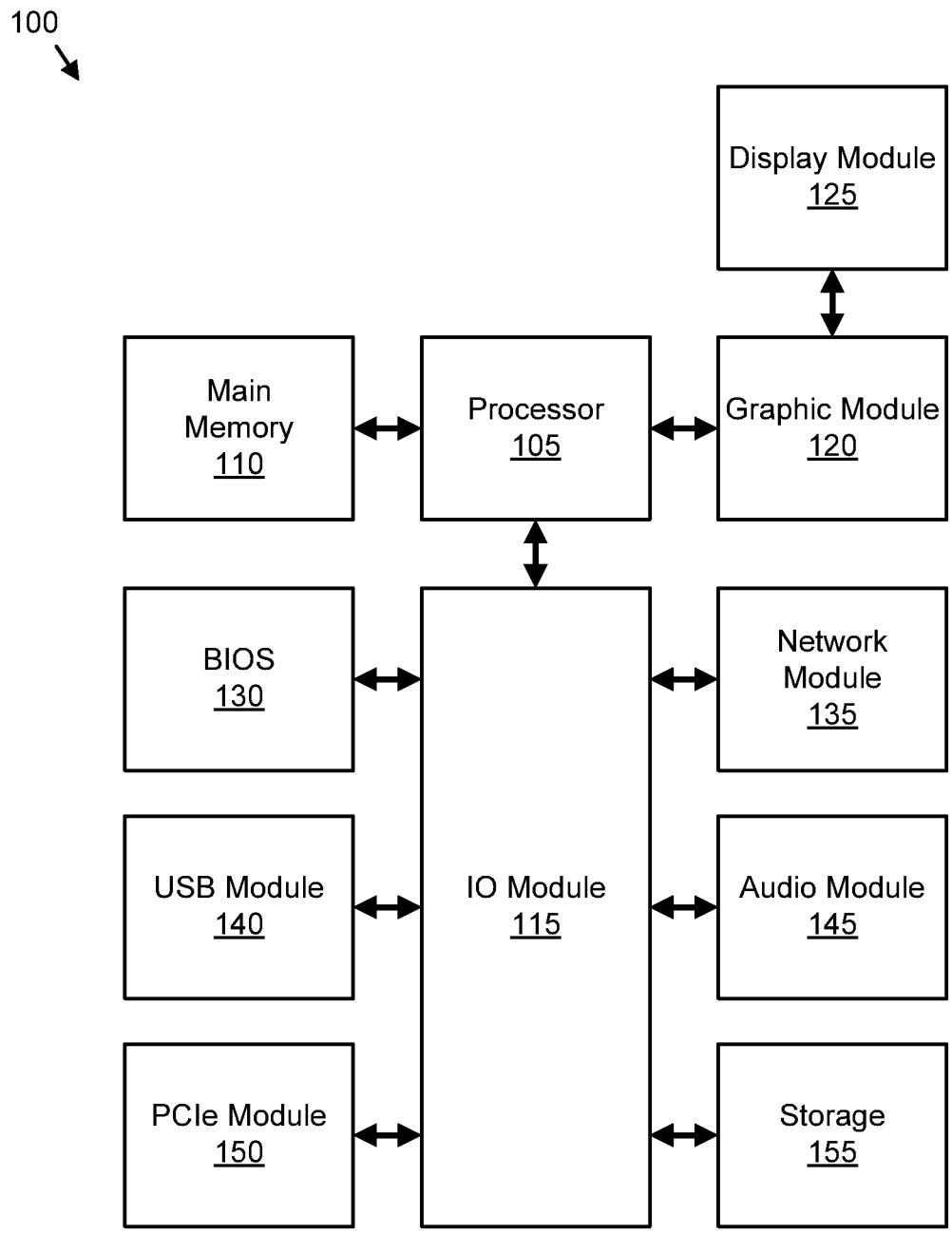
FIG. 1 is a schematic block diagram illustrating one embodiment of an information processing system in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include machine readable code embodied therein. A machine readable signal medium may be any storage device that is not a computer readable storage medium and that can communicate, propagate, or transport a program for use by or in connection with an instruction execution system, apparatus, or device. A tangible storage device, as described herein, specifically excludes propagating transitory signals per se. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information processing system 100. The information processing system 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of an information processing system 100 or multiple information processing systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the information processing system 100, so that computer readable software instructions stored on the storage module 155 can load, execute, and assume control of the information processing system 100. Alternatively, the BIOS module 130 may comprise a coded program embedded on a chipset that recognizes and controls various devices that make up the information processing system 100.

The network module 135 may communicate with the IO module 115 to allow the information processing system 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
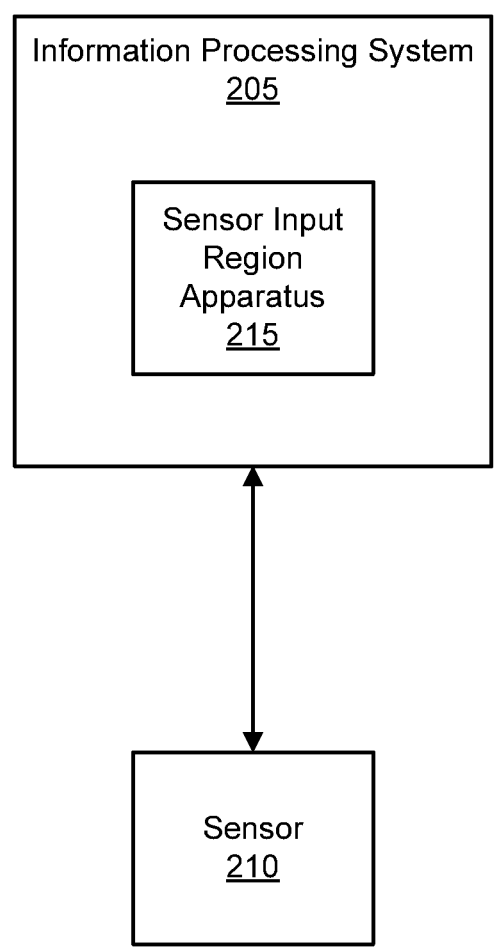
FIG. 2 is a schematic block diagram illustrating one embodiment of a system for adjusting a memory transfer setting in accordance with the present subject matter.

FIG. 2 illustrates one embodiment of a system 200 for establishing an input region for sensor input. The system 200 includes an information processing system 205 in communication with a sensor 210. The information processing system 205 includes a sensor input region apparatus 215.

The information processing system 205 may include memory, a storage device storing computer readable programs, and a processor that executes the computer readable programs as is known to those skilled in the art. The information processing system 205, in certain embodiments, may comprise the information processing system 100 depicted in FIG. 1 or comprise at least a portion of the components of the information processing system 100 and may be embodied as a portable or handheld electronic device and/or a portable or handheld computing device such as a personal desktop assistant ("PDA"), a tablet computer, a slate or pad computer, an e-Book reader, a mobile phone, a smartphone, and the like. In other embodiments, the information processing system 205 may be embodied as a desktop computer, a portable computer, a server, a mainframe computer, and/or the like.

The sensor 210 senses, records, and/or detects physical properties. The sensor 210 may be embodied separately from the information processing system 205 or may be integrated with and/or reside in the information processing system 205. In one embodiment, the sensor 210 is a motion sensor capable of capturing motion and/or gestures. In one embodiment, the sensor 210 and/or the information processing system 205 includes sensor logic to process, interpret, and/or recognize motions and/or gestures sensed by the sensor 210 and convert the motion and/or gestures into input for the information processing system 205. The sensor logic may comprise firmware, driver or application level software, hardware, and/or the like. The sensor 210 may be embodied by and/or include a camera capable of capturing motion video. In one embodiment, the camera is integrated with a laptop computer, tablet computer, Smartphone, and/or the like. In one embodiment, the sensor 210 is the Magic Cube or the evoMouse manufactured by Celluon Inc. of Seoul Korea, which sense motion and/or gestures against a flat surface such as a tabletop. In one embodiment, the sensor 210 is the Kinect motion sensing input device from Microsoft®. In one embodiment, the sensor logic is configured to operate with existing integrated cameras such as the motion sensing logic available from Extreme Reality (XTR) Ltd. of Herzlia, Israel, which is capable of using an integrated camera on a laptop, tablet computer, and/or the like. In other embodiments, the sensor 210 may be any suitable motion sensor.

In one embodiment, the sensor 210 is a touch sensor for processing touch and contact on the touch sensor. The touch sensor 210 may be responsive to user touch and/or user movement. The touch sensor 210 may translate the touch and/or movement into a relative position on the display 215. The touch sensor 210 may be a touchpad or a touchscreen. In one embodiment, the touch sensor 210 is a capacitive touch sensor 210.

Input in certain locations of a sensing area of a touch or motion sensor 210 may be undesirable, such as a natural gesture that a user does not intend to be translated as an input event but is still within the sensing area. The sensor input region apparatus 215, in one embodiment, establishes an input region for sensor input for the sensor 210. The input region may be a confined region and/or a sub-region of a total sensing area of the sensor 210. The total sensing area, in one embodiment, is total area that the sensor 210 is capable of sensing. In one embodiment, a total sensing area of a touch screen is the surface of the touch screen that is enabled for touch input, a total sensing area of a touchpad is the surface of the touch pad that is enabled for touch input, and the like. In one embodiment, a total sensing area of a motion sensor 210 is the entire area in space that the sensor 210 is able to sense gestures and/or movement.

The sensor input region apparatus 215 enforces the input region and/or causes the sensor 210 to enforce the input region by ignoring gestures sensed outside of the input region and translating gestures sensed inside of the input region into input events. By establishing an input region, unwanted input in areas outside the input region may be ignored, reducing the likelihood of unwanted input. In one embodiment, the sensor input region apparatus 215 establishes the input region based recognizing a control gesture allowing a user to indicate, to the sensor input region apparatus 215, the boundaries and characteristics of the input region in a user-friendly manner.

Although depicted in the information processing system 205, the sensor input region apparatus 215 may reside in the sensor 210, may reside in portions in the information processing system 205 and the sensor 210, or may reside in another information processing system 205 in communication with the information processing system 205 and/or sensor 210.

Figure 3A:
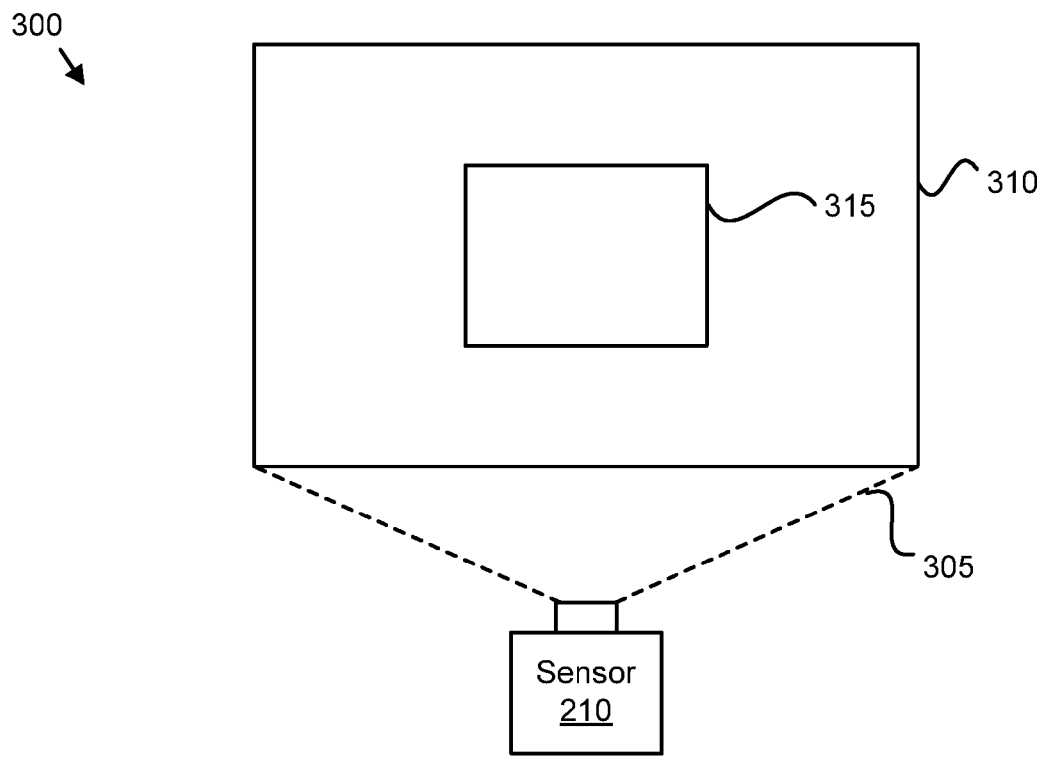
FIG. 3A is a schematic block diagram illustrating one embodiment of an motion sensor with an input region in accordance with the present subject matter.

FIG. 3A depicts one embodiment of a motion sensor 210 with an input region. The motion sensor 210 may be one embodiment of the sensor 210 in FIG. 2. The motion sensor 210 is capable of sensing 305 movement and/or gestures in a total sensing area 310, but has an established input region 315. The input region 315, in the depicted embodiment, is a confined region and a sub-region of the total sensing area 310 sensed by the sensor 210. The sensor input region apparatus 215 may translate gestures sensed within the input region 315 into input events and ignore gestures sensed outside the input region 315.

Figure 3B:
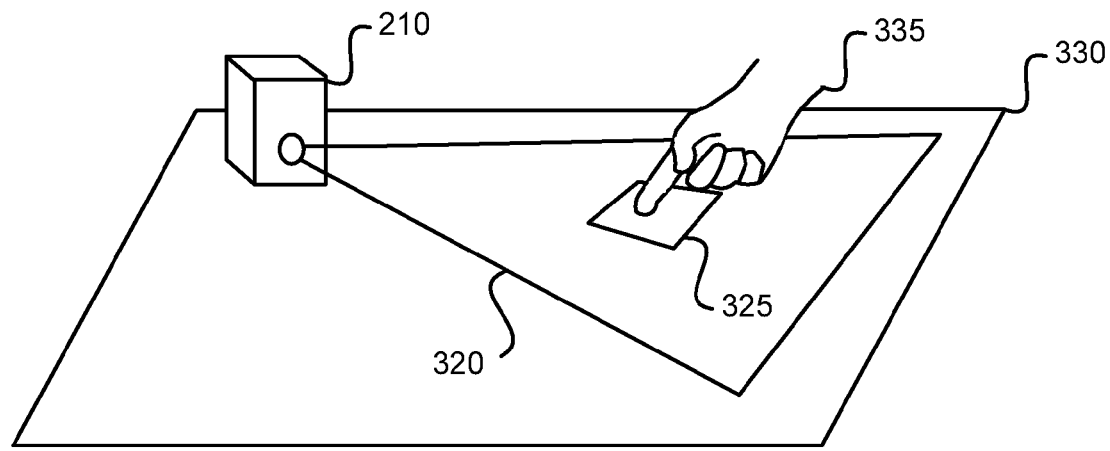
FIG. 3B is a schematic block diagram illustrating another embodiment of an motion sensor with an input region in accordance with the present subject matter.

FIG. 3B depicts another embodiment of a motion sensor 210 with an input region 325. In the depicted embodiment, the motion sensor 210 senses motion and/or gestures against a surface 330—a tabletop in the depicted embodiment. The sensor 210 may be one embodiment of the sensor 210 in FIG. 2. The sensor 210 may be capable of sensing motions and/or gestures in a total sensing area 320 against the surface 330. Furthermore, in the depicted embodiment, a user's hand 335 performs a gesture within the input region 325. As in FIG. 3A, the input region 325 is a sub-area of the total sensing area 320.

Figure 4:
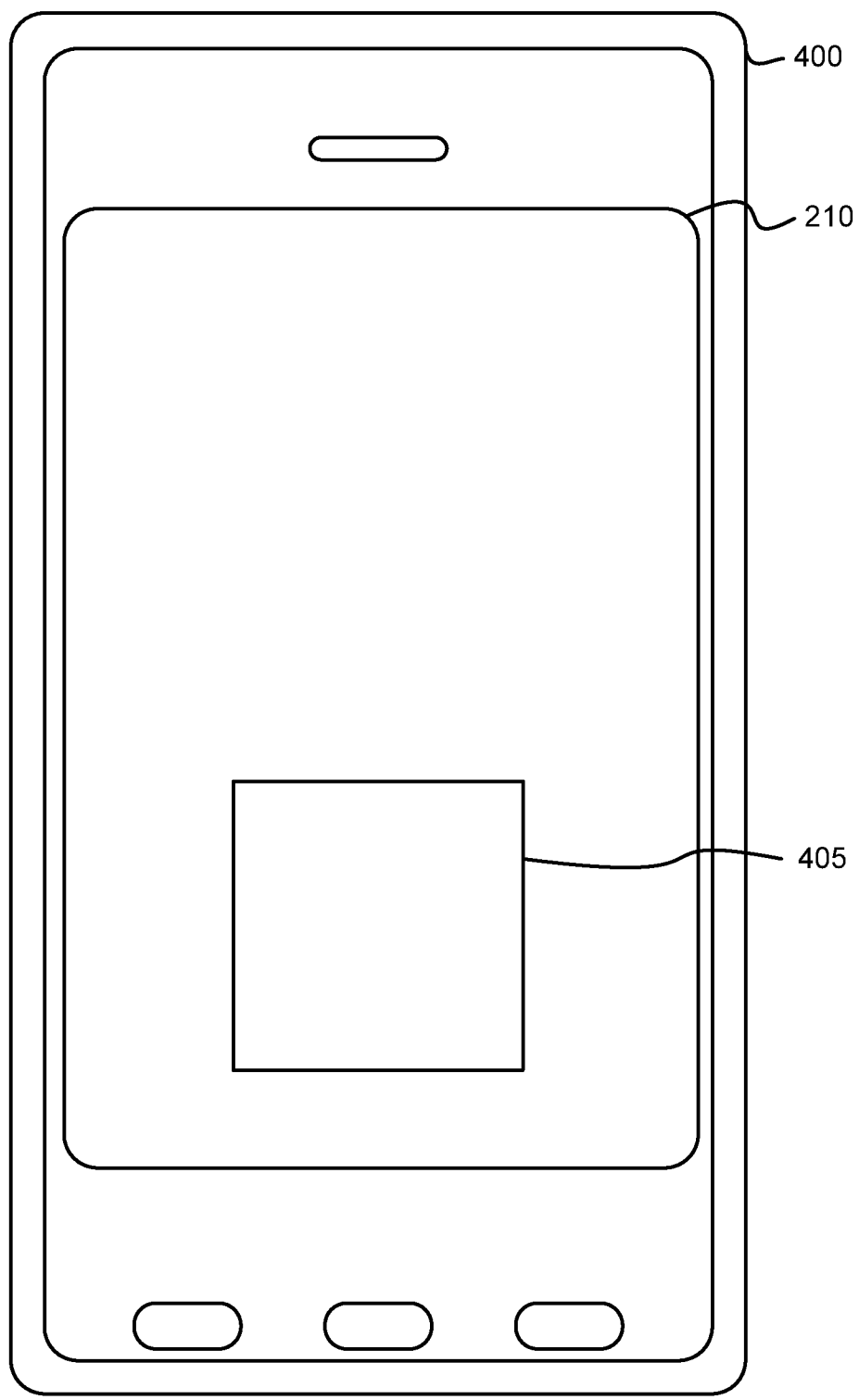
FIG. 4 is a detailed schematic block diagram illustrating one embodiment of a touch sensor with an input region in accordance with the present subject matter.

FIG. 4 depicts one embodiment of a touch sensor 210 with an input region. In the depicted embodiment, the touch sensor 210 comprises a touch screen in a Smartphone 400. The total sensing area of the Smartphone may be the touchscreen surface area 210 and the input region 405 may be established as a sub-region of the touchscreen surface area 210 as depicted. Gestures sensed outside the input region 405 may be ignored by the sensor input region apparatus 215.

Figure 5:
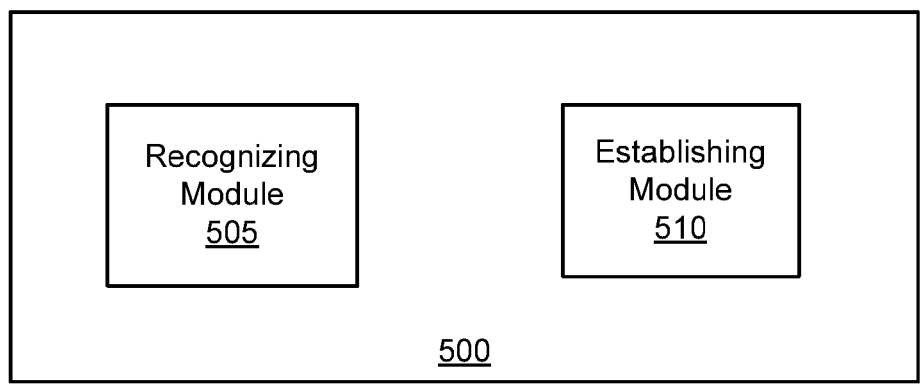
FIG. 5 is a schematic block diagram illustrating one embodiment of an apparatus for establishing an input region for sensor input in accordance with the present subject matter.

FIG. 5 illustrates one embodiment of an apparatus 500 for establishing an input region for sensor input. The apparatus 500 may comprise one embodiment of the sensor input region apparatus 215 depicted in FIG. 2. The apparatus 500 includes a recognizing module 505 and an establishing module 510.

The recognizing module 505, in one embodiment, recognizes a control gesture sensed by a sensor 210. A control gesture, as used herein, refers to a predefined gesture that is associated with a control function for configuring sensing of the sensor 210. In one embodiment, the control gesture recognized by the recognizing module 505 is for establishing an input region. In one embodiment, the sensor 210 is a motion sensor 210 and the control gesture is a predetermined movement. In one embodiment, the sensor 210 is a touch sensor 210 and the control gesture is a predetermined contact or predetermined contact plus movement against the touch sensor 210.

In one embodiment, the recognizing module 505 stores a control gesture definition. The control gesture definition may include characteristics of the control gesture and its corresponding functions. Each time the sensor 210 senses a gesture, the recognizing module 505 may reference the control gesture definition for characteristics of the predefined control gesture and determine whether the characteristics of the gesture that is sensed match those stored in the control gesture definition. If the characteristics of the sensed gesture and the stored characteristics for the control gesture definition match within the certain threshold, the recognizing module 505 may recognize the gesture sensed by the sensor 210 as the control gesture.

In one embodiment, the control gesture for establishing the input region is a gesture that indicates size and boundaries of the input region. In one embodiment, the control gesture includes the user tracing a box with a single finger or the user tracing a box with a finger of each hand at substantially the same time. For example, for a motion sensor 210, the user may trace the box in the air in front of the motion sensor 210. For a motion sensor 210 sensing movement against a surface, the user may trace the box on the tabletop. For a touch sensor, the user may trace the box on the surface of the touch sensor.

In another embodiment, the control gesture for establishing the input region includes the user sequentially touching the four corners of the boundary for the input region. The user may touch or trace the appropriate boundaries of the input region in the air, on the surface of a touch sensor 210, or on the surface of a tabletop, depending on the type of sensor 210 described above. In other embodiments, other suitable gestures for indicating the boundaries of the input region may be used.

The establishing module 510, in one embodiment, establishes an input region for sensor input in response to the recognition module recognizing the control gesture. The input region includes a confined region of a total sensing area sensed by the sensor 210. In one embodiment, the confined region is a sub-region of the total sensing area sensed by the sensor 210. In one embodiment, the control gesture indicates characteristics of the input region. Specifically, in one embodiment, the control gesture indicates and/or specifies a size, a shape, and/or a position of the input region. In one embodiment, the establishing module 510 establishes the input region based on the control gesture and/or the characteristics indicated by the control gesture. For example, if the control gesture is the user tracing the boundaries of the input region as a box, the establishing module 510 establishes the input region substantially corresponding to the box traced by the user in size and position in the total viewing area.

In one embodiment, the establishing module 510 stores characteristics of the recognized control gesture, including boundaries of the input region indicated by the control gesture. The stored characteristics may include a plurality of points indicating boundaries of the input region. In one embodiment, the points are represented by x and y coordinates defined in the sensing area. For example, if the user drew a box with a finger, the establishing module 510 may store the x and y coordinates of each corner of the box to be used as corners of the input region.

The establishing module 510, in one embodiment, establishes the input region by designating a plurality of points indicating boundaries of the input region. In one embodiment, the establishing module 510 establishes four points, each point representing a corner of the input region. In one embodiment, each point is represented by an x and y coordinate defined in the sensing area. These points defining the input region may comprise the points from the stored characteristics of the recognized gesture.

For a touch sensor 210, in one embodiment, the establishing module 510 may establish the input region in terms of x and y coordinates on the sensing area of the touch sensor 210. For a motion sensor 210, the establishing module 510 may establish the input region in terms of x and y coordinates of a video stream (e.g. locations on frames of the video stream) captured by the sensor 210.

In one embodiment, the establishing module 510 establishes the input region with a margin extending a region indicated by the control gesture. The margin may act as a "buffer" around the boundary of the input region that the user indicated with the control gesture. Because the input region may lack a visible indication of the bounds that the user has specified, the establishing module 510 provides the margin to allow for flexibility in enforcing the indicated input region. In one embodiment, the input region is 10% bigger on each side, although any suitable margin may be used.

Figure 6:
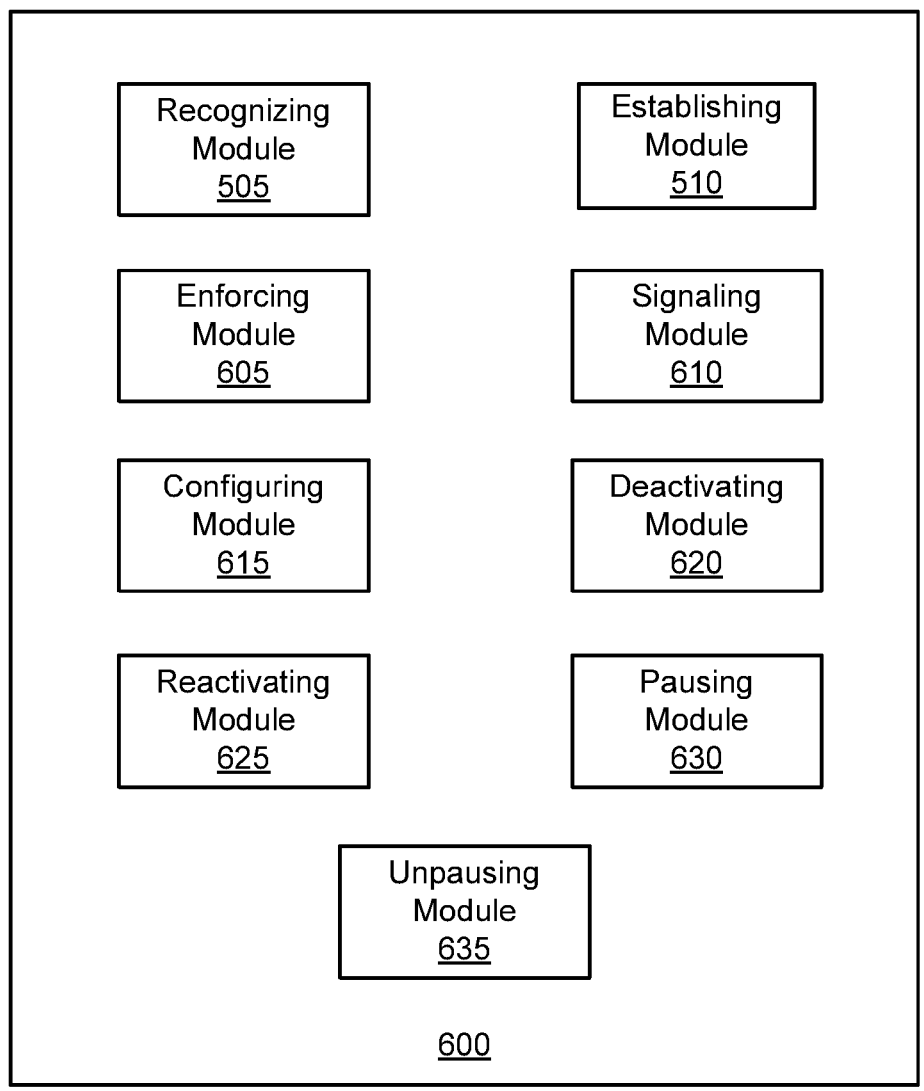
FIG. 6 is a schematic block diagram illustrating one embodiment of an apparatus for establishing an input region for sensor input in accordance with the present subject matter.

FIG. 6 illustrates another embodiment of an apparatus 600 for establishing an input region for sensor input. The apparatus 600 may comprise one embodiment of the sensor input region apparatus 215 depicted in FIG. 2. The apparatus 600 includes the recognizing module 505 and an establishing module 510, which may be substantially similar to the like named modules of FIG. 3. In addition, the apparatus 600 includes an enforcing module 605, a signaling module 610, a configuring module 615, a deactivating module 620, a reactivating module 625, a pausing module 630, and an unpausing module 635.

The enforcing module 605, in one embodiment, enforces the input region. In one embodiment, the enforcing module 605 enforces the input region by translating gestures sensed within the input region into input events and ignoring gestures sensed outside the input region. Specifically, the enforcing module 605, in one embodiment, monitors for gestures. If the enforcing module 605 recognizes a gesture, the enforcing module 605 may determine whether the gesture is within the input region. If the gesture is outside the input region, the enforcing module 605 may ignore the gesture. If the gesture is inside the input region, the enforcing module 605 may translate the gesture into an input event.

In one embodiment, the enforcing module 605 determines whether a gesture is within the input region by determining whether x and y coordinates of the gesture fall within the x and y coordinates of the input region. For example, the enforcing module 605 may reference the x and y coordinates of the input region and the sensed gesture on the surface area of a touchscreen or in the video stream from a motion sensor.

As used herein, an input event represents a gesture sensed by the sensor 210 for representation as input. In one embodiment, the input event specifies characteristics of the gesture. In one embodiment, the input event signals the information processing system 205 to take a particular action and/or represent an action in a user interface. For example, a user may wave a hand and the resulting input event may cause an animated character on a display of the information processing system 205 to also wave a hand.

In one embodiment, the enforcing module 605 is integrated and/or in communication with sensor logic for the sensor 210 that translates gestures into input events. Translating gestures into input events may include communicating information about the gesture, including gesture characteristics, to sensor logic and/or the information processing system 205 for further processing, allowing the sensor logic and/or information processing system 205 to process a certain gesture, instructing the sensor logic and/or information processing system 205 to process a gesture, and/or the like. Furthermore, ignoring gestures may include not communicating information about the gesture to sensor logic and/or the information processing system 205 for further processing, notifying the sensor logic and/or information processing system 205 to not process a gesture and/or translate a gesture into an input event, and/or the like.

In one embodiment, the enforcing module 605 comprises application level software that receives notification of sensed gestures from sensor logic and may translate or ignore sensed gestures in higher levels of software.

In one embodiment, the enforcing module 605 translates control gestures sensed outside the input region. Therefore, in this embodiment, the enforcing module 605 ignores non-control gestures sensed outside the input region. The enforcing module 605 may make a further determination of whether a gesture sensed outside the input region is a control gesture (a predetermined gesture for configuration of the sensor 210) and translate the gesture in response to determining that it is a control gesture.

The signaling module 610, in one embodiment, detects a gesture pass across a boundary of the input region and issues a signal in response to detecting the gesture pass across the boundary of the input region. In one embodiment, the signaling module 610 issues the signal when a gesture begins within the input region and passes outside the input region continuously. The signal may include and/or cause a beep, vibration, wobble, and/or the like. For example, the signaling module 610 may cause the information processing system 205 to emit a beep or chime (e.g. through speakers in communication with the information processing system 205), or cause a handheld device such as a Smartphone, which has an integration vibration device, to vibrate (e.g. by sending a command to the vibration device through a device Application Programming Interface ("API").

The configuring module 615, in one embodiment, presents a configuration utility. In one embodiment, the establishing module 510 establishes the input region in response to input through the configuration utility. The configuration utility may be a configuration menu, screen, and/or the like on a display of the information processing system 205. In one embodiment, the configuring module 615 presents the configuration utility in response to a control gesture.

In an embodiment with a motion sensor 210 sensing motion and gestures against a surface, the control gesture for the configuration utility may include the user placing the user's palm on the surface. In one embodiment, when the palm is lifted, the configuring module 615 exits the configuration utility. The user may use the other hand to guide a pointer on the display (e.g. the user's gestures are translated into movement of a pointer) to indicate and configure the input region. The user may also use control gestures with the other hand to indicate and configure the input region. In one embodiment, the user may tap the surface twice for the configuration utility, which remains active until the user again taps the surface one or more times or uses another suitable gesture.

In certain embodiments, the apparatus 600 supports other control gestures to control and/or configure functionality of the sensor. These control gestures may have control gesture definitions for comparison with sensed gestures to determine whether a control gesture has been sensed similar to the control gesture for an input region as described above.

The deactivating module 620, in one embodiment, deactivates the input region in response to recognizing a deactivation control gesture. In one embodiment, deactivating the input region ends the enforcement of the input region such that gestures outside the input region may be recognized and translated into input events. In one embodiment, the deactivation control gesture includes a swipe across the input region with the back of the user's hand (e.g. to brush the input region aside"). In another embodiment the deactivation control gesture comprises the user tracing an "X" in an area outside the input region. In certain embodiments, other suitable gestures may be used as deactivation control gestures.

The reactivating module 625, in one embodiment, reactivates the input region in response to recognizing a reactivating control gesture. In one embodiment, the reactivating module 625 restores and reactivates a previously established input region that had been deactivated by the deactivating module 620. In one embodiment, the reactivating control gesture comprises the user "dragging" a plurality of fingers across from either side of the input region's former position, although other suitable gestures may comprise the reactivating control gesture. Also, an input region (newly defined) may be established using the control gesture for establishing an input region described above.

The pausing module 630, in one embodiment, enters into a sensor pause mode in response to recognizing a pausing control gesture. In one embodiment, the enforcing module 605, in the sensor pause mode, ignores non-control gestures during the sensor pause mode. In one embodiment, the pausing module 630 establishes the total sensing area of the sensor 210 as if the total sensing area is outside of an input region.

In one embodiment in which, the pausing control gesture comprises one palm down on the surface when the sensor 210 senses against a flat surface or one palm down in the air with other sensors 210, and the other hand tracing out an "X." In one embodiment, the pausing control gesture comprises one finger from each hand making an "X" in the field of view of the sensor 210, covering up a sensor 210 for a period of time (e.g. one second), wiping palm across the table top or in the air, followed by a palm-tap (an up and down motion of the palm). In other embodiments, other suitable gestures may be used as the pausing control gesture.

The unpausing module 635, in one embodiment, exits the sensor pause mode in response to recognizing an unpausing control gesture. In one embodiment, the unpausing module 635 restores the input region if one was in effect and gestures inside the input region would be translated as before the sensor pause mode. In certain embodiments, the unpausing module 635 resumes translation of gestures into input events without re-establishing the input region. In one embodiment, the unpausing control gesture includes a palm wiping gesture or a palm wiping across the surface when the sensor 210 senses against the flat surface, followed by a palm-tap (an up and down motion with the palm).

Figure 7:
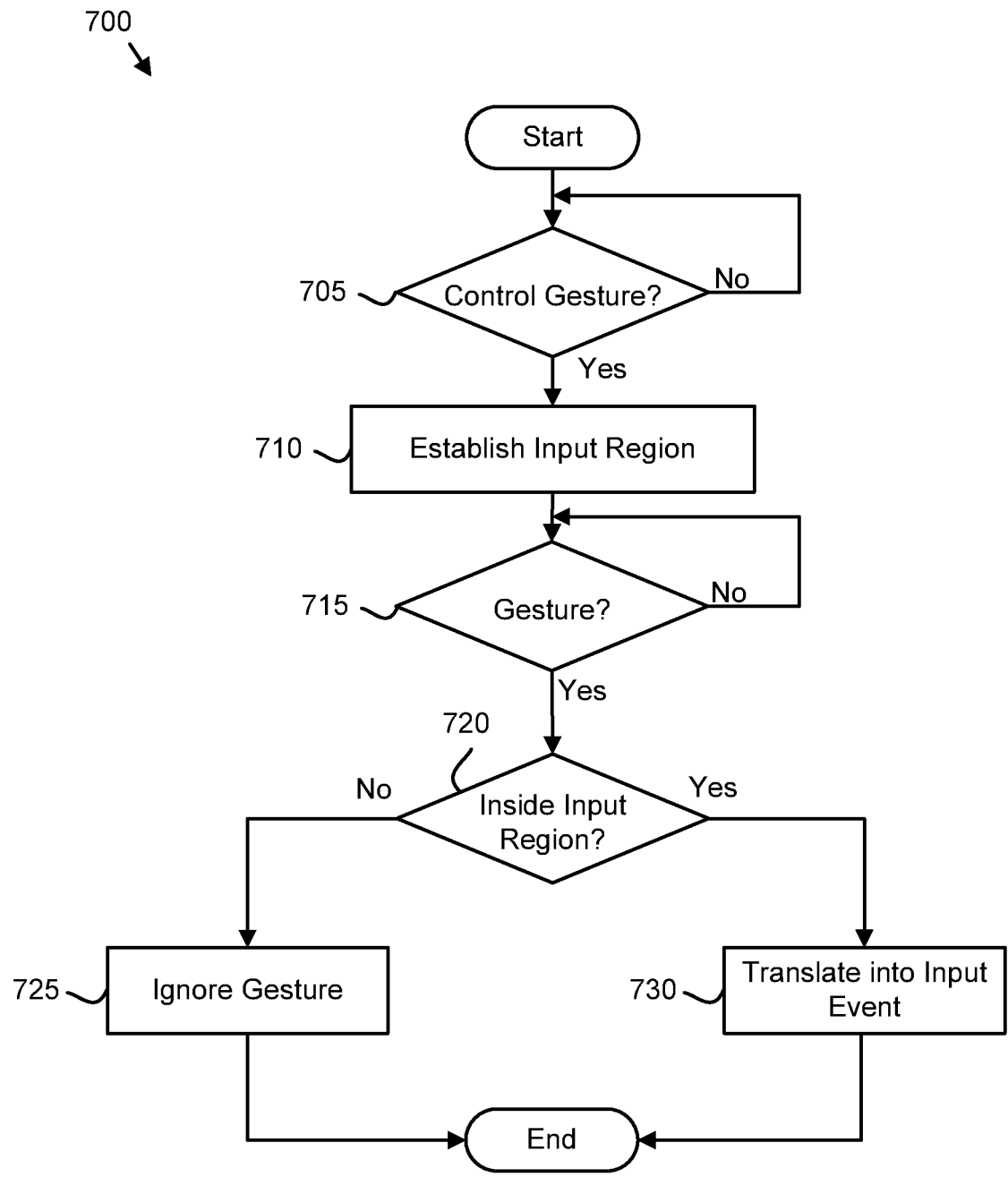
FIG. 7 is a schematic flow chart diagram illustrating one embodiment of a method for establishing an input region for sensor input in accordance with the present subject matter.

FIG. 7 illustrates one embodiment of a method 700 for establishing an input region for sensor input. The method 700 may implement at least a portion of the functions of the apparatus 500 of FIG. 5. The method 700 begins and the recognizing module 505 monitors 705 for a control gesture. In one embodiment, the control gesture is for establishment of an input region. If a sensor 210 senses a gesture and the recognizing module 505 does not recognize 705 the sensor 210 as a control gesture, the recognizing module 505 continues to monitor 705 for a control gesture. Alternatively, if the recognizing module 505 recognizes 705 a control gesture (e.g. the sensor 210 senses a gesture which the recognizing module 505 recognizes as a control gesture), the establishing module 510 establishes 710 an input region for sensor input. The input region may be a confined region of a total area sensed by the sensor 210. In one embodiment, the confined region includes and/or is embodied as a sub-region of the total sensing area sensed by the sensor 210. In one embodiment, the control gesture indicates a size, a shape, and/or a position of the input region and the establishing module 510 establishes the input region based on the control gesture (e.g. with characteristics corresponding to those indicated by the control gesture).

If the enforcing module 605 does not recognize 715 a gesture, the enforcing module 605 continues monitoring 715 for gestures. If the enforcing module 605 recognizes 715 a gesture, the enforcing module 605 determines 720 whether the gesture is inside the input region. If the enforcing module 605 determines 720 that the gesture is outside the input region, the enforcing module 605 ignores 725 the gesture and the method 700 ends. Alternatively, if the enforcing module 605 determines 720 that the gesture is inside the input region, the enforcing module 605 translates 730 the gesture into an input event and the method 700 ends.

Figure 8:
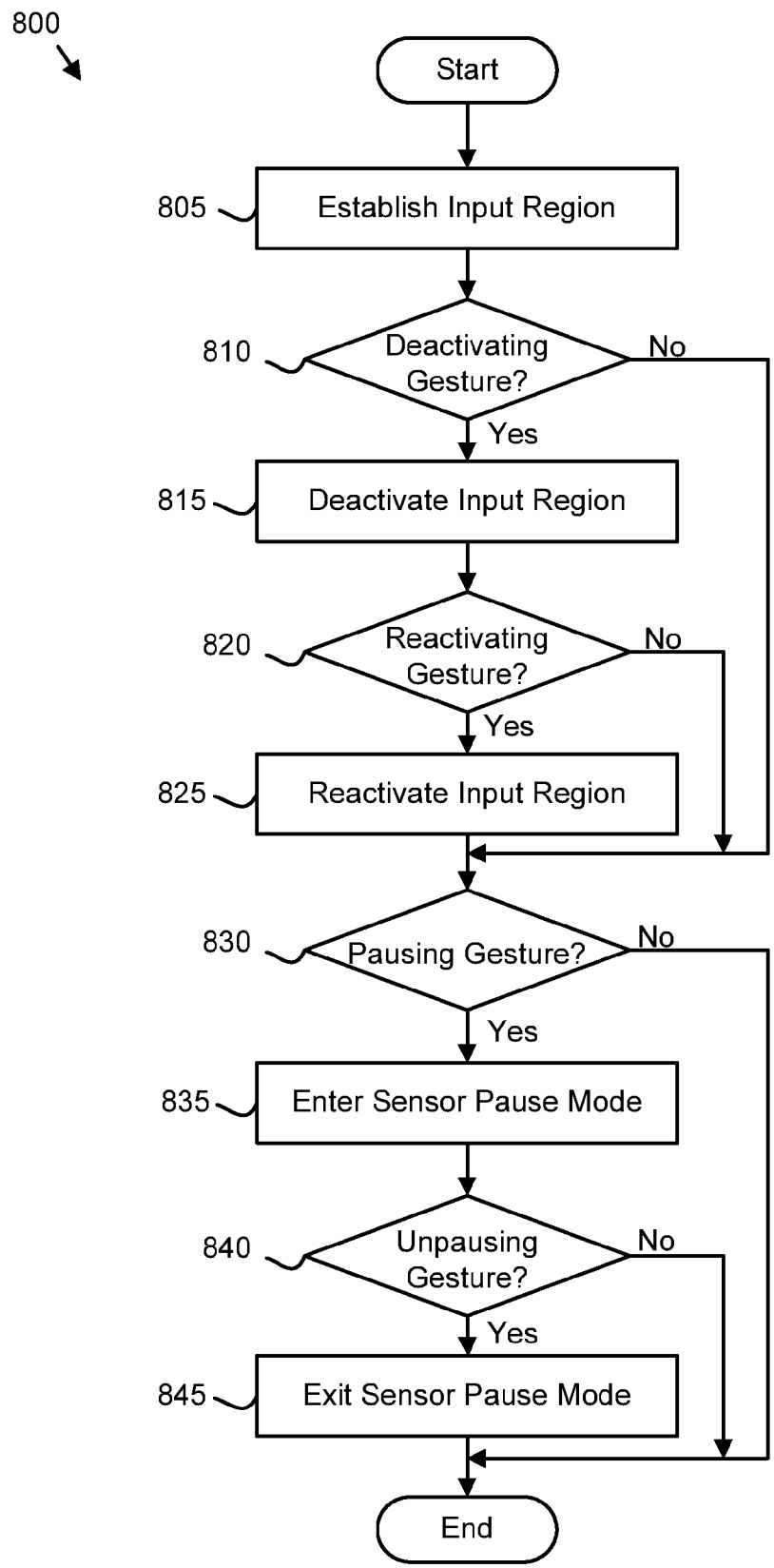
FIG. 8 is a schematic flow chart diagram illustrating one embodiment of a method for performing control functions in accordance with the present subject matter.

FIG. 8 illustrates one embodiment of a method 800 for performing control functions. The method 800 may implement at least a portion of the functions of the apparatus 500 of FIG. 5. The method 800 begins and the establishing module 510 establishes 805 an input region as described above. If the deactivating module 620 recognizes 810 a deactivation control gesture, the deactivating module 620 deactivates 815 the input region. If the reactivating module 625 recognizes 820 a reactivating control gesture, the reactivating module 625 reactivates 820 the input region. If the reactivating module 625 does not recognize 820 a reactivating control gesture, and, referring to step 810, if the deactivating module 620 does not recognize 810 a deactivating gesture, the method 800 continues with step 830.

If the pausing module 630 does not recognize 830 a pausing gesture, the method 800 ends. Alternatively, if the pausing module 630 recognizes 830 a pausing gesture, the pausing module 630 enters 835 into a sensor pause mode. If the unpausing module 635 recognizes 840 an unpausing control gesture, the unpausing module 635 exits 845 the sensor pause mode and the method 800 ends. Alternatively, the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing machine-readable code;
a processor executing the machine-readable code, the machine-readable code comprising:
a recognizing module recognizing a control gesture sensed by a sensor, the control gesture for defining an input region, the control gesture comprising one of tracing the input region and touching corner of the input region;
an establishing module establishing the input region for sensor input in response to the recognition module recognizing the control gesture, wherein the input region is a sub-region of the total sensing area sensed by the sensor; and
an enforcing module that ignores sensor input that is outside of the input region, the enforcing module enforcing the input region until a deactivation gesture is sensed.

2. The apparatus of claim 1, wherein the sub-region is a different shape than the total sensing area.

3. The apparatus of claim 1, the enforcing module translating a plurality of gestures sensed within the input region into respective input events.

4. The apparatus of claim 1, wherein the control gesture indicates one or more of a size, a shape, and a position of the input region.

5. The apparatus of claim 1, wherein the sensor comprises a motion sensor and wherein the control gesture comprises a predetermined movement.

6. The apparatus of claim 1, wherein the sensor comprises a touch sensor and wherein the control gesture comprises a predetermined contact with the touch sensor.

7. The apparatus of claim 1, further comprising a signaling module detecting a gesture that begins within the input region and passes outside of the input region.

8. The apparatus of claim 1, wherein the establishing module establishes the input region with a margin extending a region indicated by the control gesture.

9. The apparatus of claim 1, further comprising a configuring module presenting a configuration utility, wherein the establishing module establishes the input region in response to input through the configuration utility.

10. The apparatus of claim 1, further comprising a deactivating module deactivating the input region in response to recognizing a deactivation control gesture that is inside the input region.

11. The apparatus of claim 10, further comprising a reactivating module reactivating the input region in response to recognizing a reactivating control gesture.

12. A method comprising:
recognizing a control gesture sensed by a sensor, the control gesture for defining an input region;
establishing the input region for sensor input in response to recognizing the control gesture, wherein the input region is a sub-region of a total sensing area sensed by the sensor;
enforcing the input region until a deactivation gesture is sensed, the control gesture comprising one of tracing the input region and touching corners of the input region; and
ignoring sensor input that is outside of the input region.

13. The method of claim 12, wherein the sub-region is a different shape than the total sensed area.

14. The method of claim 12, further comprising translating a plurality of gestures sensed within the input region into input events.

15. The method of claim 12, wherein the sensor comprises a motion sensor and wherein the control gesture comprises a predetermined movement.

16. The method of claim 12, wherein the sensor comprises a touch sensor and wherein the control gesture comprises a predetermined contact with the touch sensor.

17. The method of claim 12, further comprising:
entering into a sensor pause mode in response to recognizing a pausing control gesture;
ignoring non-control gestures during the sensor pause mode; and
exiting the sensor pause mode in response to recognizing an unpausing control gesture.

18. A computer program product comprising a tangible storage device storing machine readable code executed by a processor to perform the operations of:
- recognizing a control gesture sensed by a sensor, the control gesture for defining an input region that is a sub-region of a total sensing area sensed by the sensor;
- establishing the input region for sensor input in response to recognizing the control gesture, the control gesture comprising one of tracing the input region and touching corners of the input region;
- enforcing the input region until a deactivation gesture is sensed; and
- ignoring sensor input that is outside of the input region.

19. The computer program product of claim 18, the sub-region being a different shape than the total sensing area.

20. The computer program product of claim 18, wherein the operations further comprise translating a plurality of gestures sensed within the input region into input events.

* * * * *